United States Patent [19]

Chiu

[11] Patent Number: 5,239,915
[45] Date of Patent: Aug. 31, 1993

[54] VIBRATIONAL FOOD SOAKING DEVICE FOR A VACUUM-FRYING MACHINE

[76] Inventor: Yao-Jui Chiu, No. 52, Tieh Hsi Ts'un, Hsi Kou Hsiang, Chiayi Hsien, Taiwan

[21] Appl. No.: 5,627
[22] Filed: Jan. 19, 1993
[51] Int. Cl.⁵ .............................. A47J 37/12
[52] U.S. Cl. ............................. 99/407; 99/410; 99/472
[58] Field of Search ............ 99/330, 336, 403, 407, 99/408, 409, 410–414, 472; 261/DIG. 8, 167, 186; 426/417, 438, 231; 126/391

[56] References Cited

U.S. PATENT DOCUMENTS

| | | | |
|---|---|---|---|
| 3,505,072 | 4/1970 | Rullman | 99/407 |
| 3,648,595 | 3/1972 | Morris | 210/DIG. 8 X |
| 3,973,481 | 8/1976 | Mies | 99/408 |
| 4,508,026 | 4/1985 | Anetsberger et al. | 99/336 X |
| 4,719,850 | 1/1988 | Sowell | 99/407 X |
| 4,732,081 | 3/1988 | Sakuma | 426/438 X |
| 4,902,522 | 2/1990 | Rudibaugh | 426/231 |
| 5,018,438 | 5/1991 | Grandi | 99/330 X |
| 5,097,752 | 3/1992 | Kung | 99/410 X |
| 5,168,797 | 12/1992 | Wang | 99/403 X |
| 5,179,891 | 1/1993 | Chiu | 99/472 X |

FOREIGN PATENT DOCUMENTS 1185225  7/1989  Japan ....................................... 99/407

Primary Examiner—Timothy F. Simone
Attorney, Agent, or Firm—Bacon & Thomas

[57] ABSTRACT

A vibration-type food soaking device adapted for a vacuum-frying machine is provided with a soaking tank and a food receiving basket which is associated with a pair of hydraulically-operated cylinders so as to permit the basket to be oscillated up and down; and also connected to an oscillation motor, permitting the same to be vibrationally moved from right to left. The tank is associated with a high-temperature germicide unit and a soaking liquid supplement unit at one side thereof by way of a soaking liquid outlet tube and a liquid recycling tube; and also associated with an air compressor and an air filter unit at the other side thereof with an air dispensing frame having a plurality of air outlets disposed thereon located at the bottom of the soaking tank so as to permit pressurized air produced by the air compressor to evenly stir up the soaking liquid and the soaked food in cooperation with the vibrated and shaked food receiving basket whereby the soaking process can be effected in a faster and better manner.

2 Claims, 3 Drawing Sheets

VIBRATIONAL FOOD SOAKING DEVICE FOR A VACUUM-FRYING MACHINE

BACKGROUND OF THE INVENTION

The present invention relates to an improved vibrational food soaking device adapted for a vacuum frying machine. The food soaking device is equipped, with a soaking tank and a food receiving basket which is associated with a pair of hydraulically operated cylinders movable up and down and an oscillation motor making the basket shake from right to left; and an air dispensing frame associated with an air compressor is disposed at the bottom of the soaking tank so as to permit pressurized air to stir up the soaked food as well as the soaking liquid along with the vibrated and shaked basket whereby the soaked food can be thoroughly, evenly soaked at a faster speed.

In general, the conventional food frying process mainly includes the steps of selection, cleaning, trimming, slicing and sorting, bleaching, soaking, vibrational dehydration, vacuum frying, deoiling, sorting, packing. The soaking is usually done in a very large soaking tank in which food to be soaked is plunged. This kind of primitive soaking process has the following disadvantages:

1. The food is piled up in the soaking tank with some of the sliced pieces covered without deeply plunging in the soaking liquid, resulting in the variation of color on the skin of the fried food.

2. The food plunged in the soaking tank without constantly being stirred up is apt to be soaked with different degree and the soaking time is relatively long and the soaking effect is unsatisfactory; and the food in the soaking liquid easily goes sour and becomes fermented.

3. The artificial stirring of the soaking liquid and the food will cause the increase of the production cost in one aspect and also make the soaked food cut into pieces easily broken or damaged.

SUMMARY OF THE INVENTION

Therefore, the primary object of the present invention is to provide an improved vibrational food soaking device which is equipped with a food receiving basket and a soaking tank, the receiving basket is connected to a pair of hydraulically operated cylinders and an oscillation motor so as to permit the basket to be vibrated up and down and shaked right to left with the the food disposed therein evenly soaked by way of the vibrational operation of the food receiving basket which can be plunged into the soaking tank and lifted up to separate therefrom.

Another object of the present invention is to provide an improved vibrational soaking device which is provided with an air dispensing frame at the bottom of the soaking tank which is associated with an air compressor and an air filter so that air bubble produced by the same can make the soaking food and the liquid stirred up.

One further object of the present invention is to provide an improved vibrational soaking device which is hygienic to operate and the soaking liquid can be prevented from going sour and fermented; and the soaking time is effectively shortened and the quality of the soaking process greatly improved.

DETAILED DESCRIPTION OF THE PREFERRED EMBODIMENT

Figures 1, 1A:
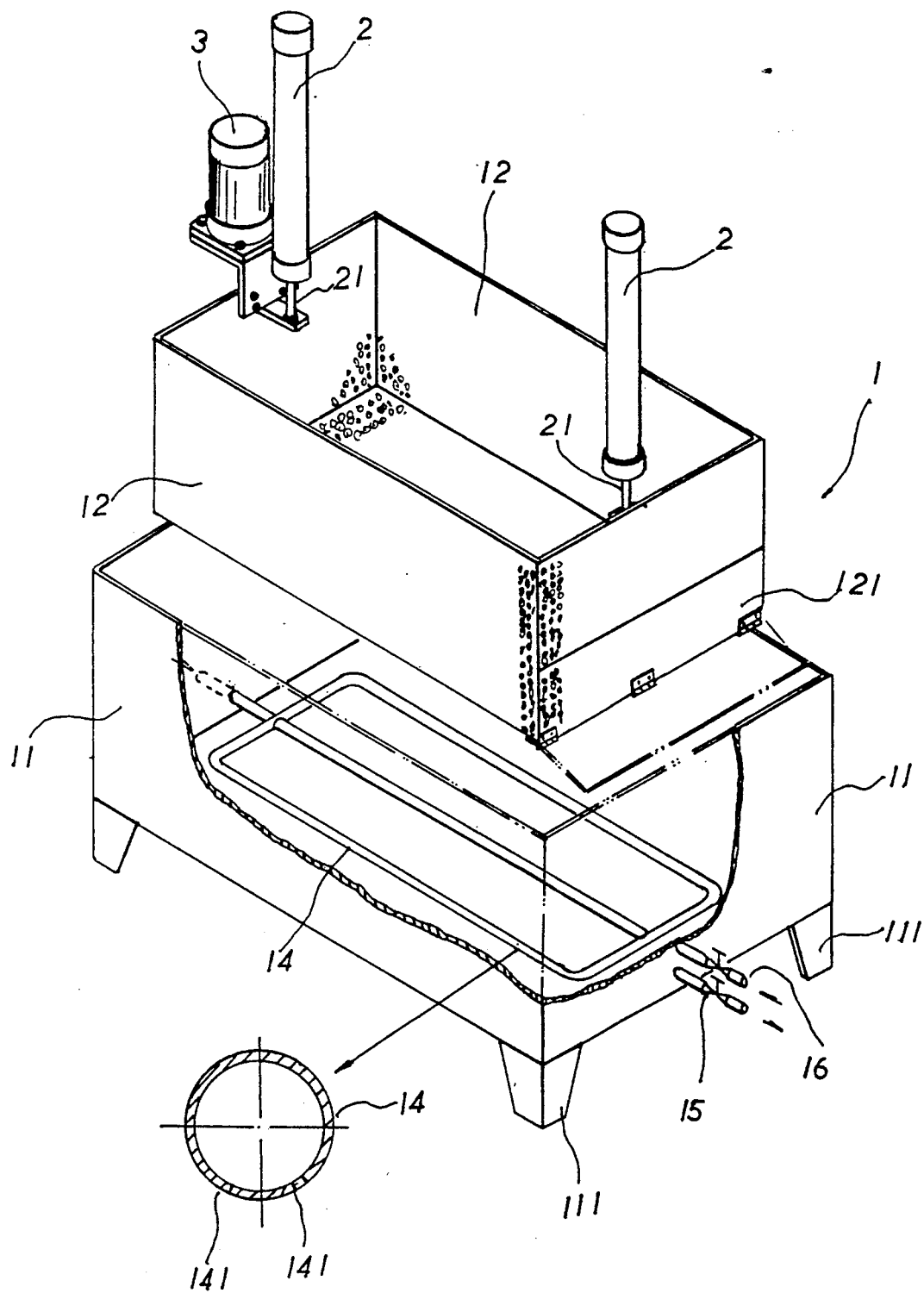
FIG. 1 is a perspective diagram showing the structure of the present invention.
FIG. 1A is a sectional diagram showing the structure of the air dispensing frame.
Figure 2:
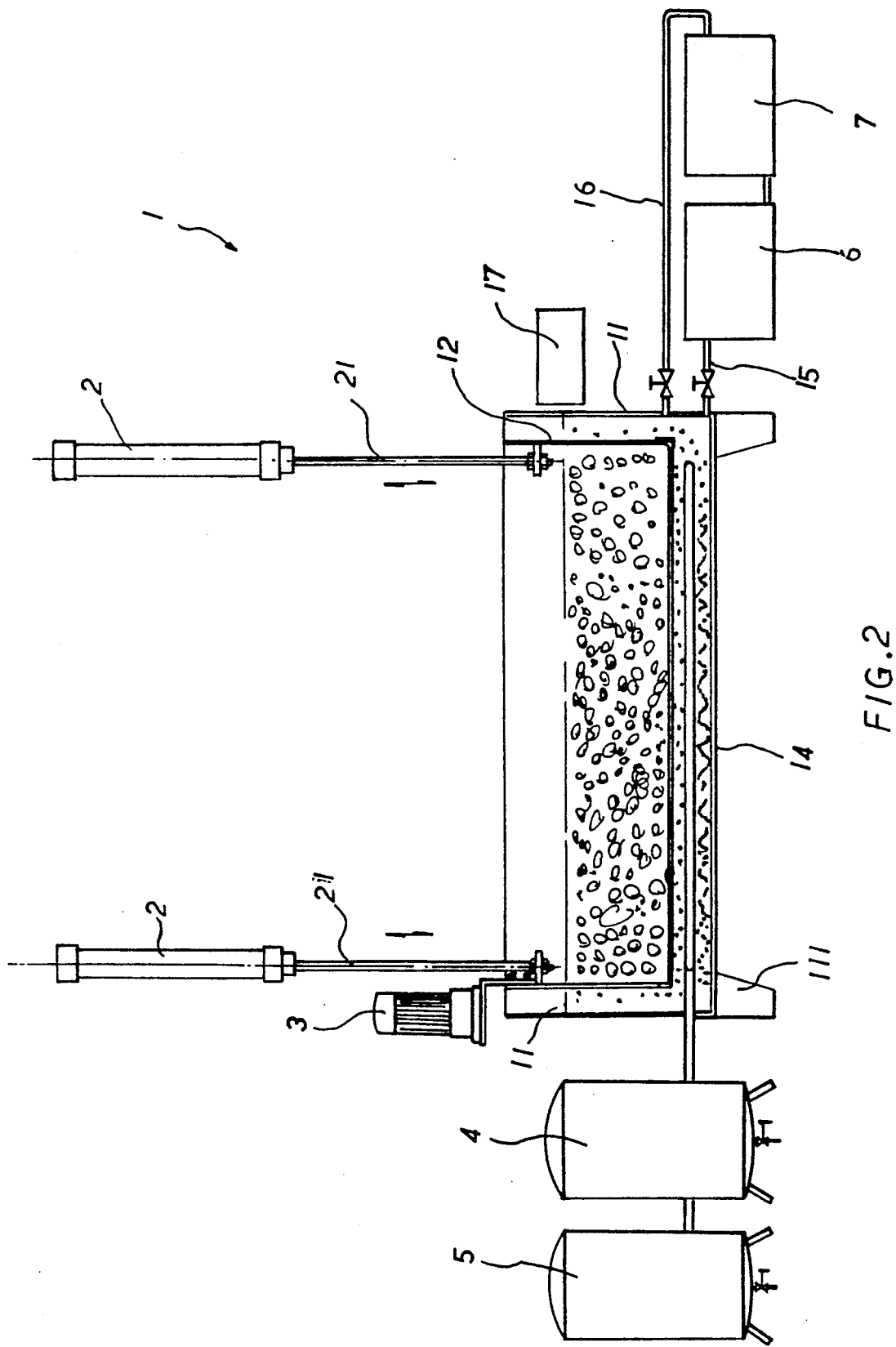
FIG. 2 is a side view of the present invention.
Figure 3:
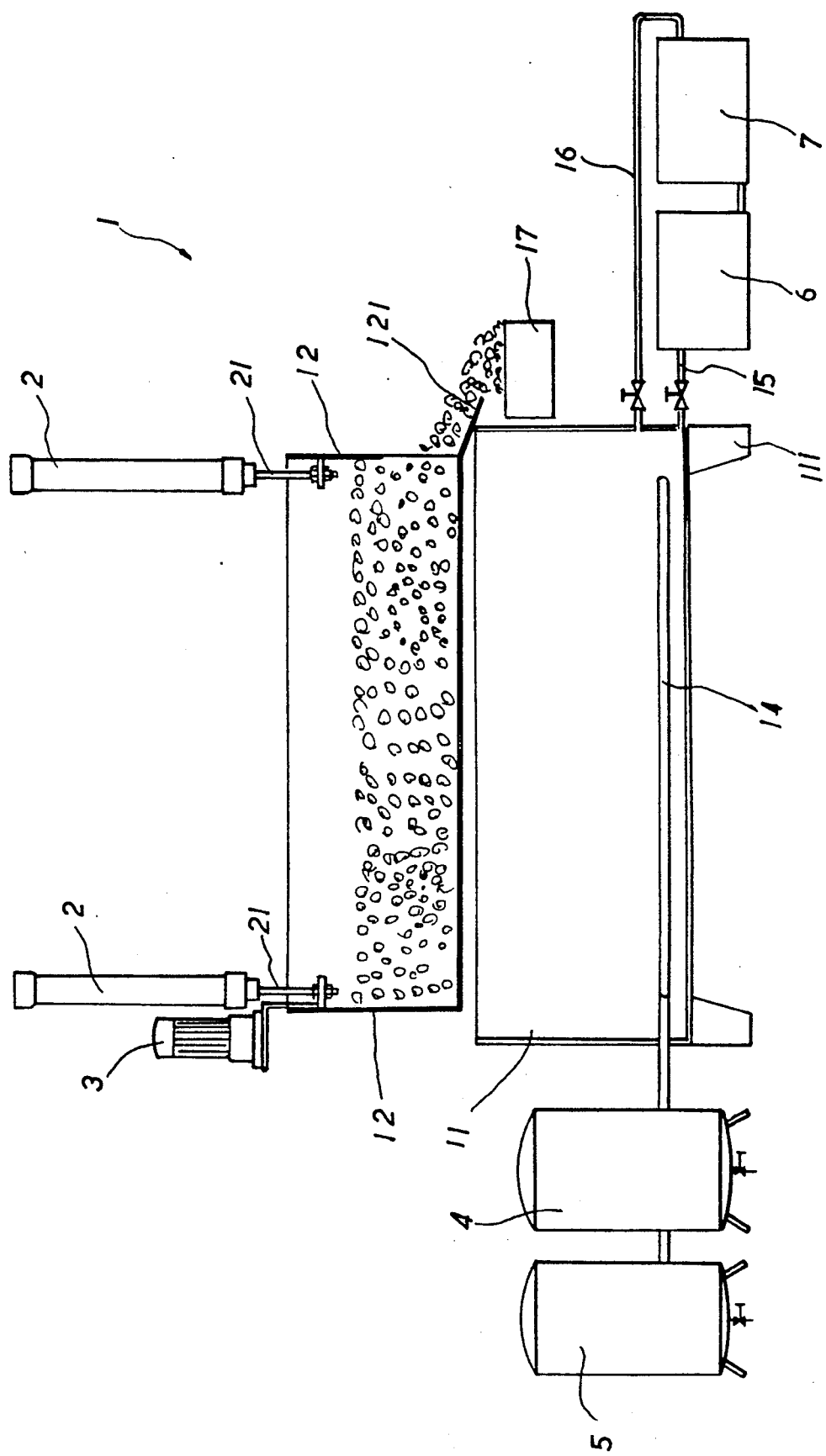
FIG. 3 is a diagram showing the soaked food being poured out of the food receiving basket.

Referring to FIGS. 1, 1A, 2, 3, the improved vibrational food soaking device 1 of the present invention is comprised of a soaking tank 11 having a supporting leg 111 disposed at each underside corner thereof, and a food outlet passage 17 disposed at the right side of the upper edge of the soaking tank 11. A soaking liquid outlet tube 15 disposed at one side and near the bottom of the soaking tank 11 is connected to a high-temperature germicide unit 6 and connected further to a soaking liquid supplement tank 7 and a recycling tube 16 extended from the supplement tank 7 is connected to the soaking tank 11 so as to permit the discharged soaking liquid to be processed and recharged into the soaking tank 11.

On the opposite side of the soaking tank 11 is disposed an air compressor 4 and an air filter unit 5 that are connected to an air dispensing frame 14 disposed at the bottom of the soaking tank 11. As shown in FIG. 1A. On the air dispensing frame 14 are disposed a plurality of air outlets 141. An open-top food receiving basket 12 is made in a net-like manner. A pivot door 121 is disposed at the right side of the food receiving basket 12 so as to permit soaked food to be discharged therefrom. The food receiving basket 12 is connected to a piston rod 21 of a hydraulically-operated cylinder 2 at each of the two sides thereof. An oscillation motor 3 disposed at one side of the food receiving basket 12 is employed to oscillatingly move the same from right to left repeatedly.

In operation, the hydraulically-operated cylinders 2 actuates the piston rods 21 connected to the food receiving basket 12 to extend outwardly and retract inwardly so as to make the basket move up and down repeatedly. The oscillation motor 3 disposed outside the basket 12 and associated therewith can actuate the basket shake from right to left. In the meanwhile, the air compressor 4 pumps air into the air dispensing frame 14 and the pressurized air is expelled out of the frame 14 via a plurality of air outlets 141. After the soaking liquid has been used for a period of time, the sugar content of the liquid drops below a certain level, the soaking liquid is discharged from the soaking tank 11 via the liquid outlet tube 15 and is led into the germicide unit 6 and the liquid supplement tank 7 so as to make the sugar content of the liquid back to normal, and the fresh liquid is recharged via the recycling tube 16 into the soaking tank 11. At the end of the soaking process, the cylinders 2 will be actuated to lift up the food receiving basket 12 over the top of the soaking tank 11 and the pivot door 121 is opened so that the oscillation motor 3 can pour the soaked food in the basket 12 into the outlet passage 17 by way of back and forth oscillation.

In practice, the soaking tank 11 is filled with sugar liquid 400 kg (varied from product to product, depending on the kind of food to be soaked), and then add the processed food 350 kg to the soaking liquid next, and then start to oscillate the basket 12 up and down first for one minute in every 20 minutes, afterwards, the oscillation motor 3 is actuated to operate for one minute to shake the basket back and forth from right to left; then air filtered by the air filter unit 5 is compressed and pumped into the air dispensing frame 14 and discharged into the soaking tank 12 via the air outlets 141 for about 5 minutes in every 10 minutes. This kind of operation is repeated for about 2-5 hours to complete the soaking operation.

It can be clearly seen that the present invention has the following features:

1. The soaking speed can be reduced at least 3-5 hours as a result of the use of the present invention.

2. The contents of the soaking liquid can be evenly distributed so as to permit the soaked food to be thoroughly and well treated.

3. No manual labor is used in the process.

4. The soaked food can be protected from being damaged by the artificial stirring of the soaking liquid in one aspect and make the operation thereof more hygienic in another aspect.

5. The up and down oscillation and right and left shaking of the food receiving basket and the introduction of compressed air into the soaking liquid can protected the soaked food from easily going bad and turning fermented.

6. The color of the soaked food can be universally obtained and the frying time can be reduced from 5 to 10 minutes, and the general vacuum frying time is 15-25 minutes.

7. The oscillation of the food receiving basket helps the soaked food dehydrated so as to reduce the sugar particles sticking to the skin of the soaked food, and the soaked food is better protected from damage; resulting in the frying oil being not easily spoiled in the process of vacuum frying of the soaked food.

I claim:

1. An improved vibrational food soaking device adapted for vacuum frying machine, comprising:
   a soaking tank having four supporting legs each disposed at the underside corner thereof;
   an open-topped food receiving basket having a net-like structure being equipped with a pivotal door at one side thereof;
   a pair of hydraulically operated cylinders each having a piston extension rod securedly connected respectively to one side of said food receiving basket being able to actuate said basket to move up and down;
   an oscillation motor securedly associated with one side of said food receiving basket being able to shake the same from right to left repeatedly;
   a liquid outlet tube in controlled communication with said soaking tank;
   a recycling tube in controlled communication with said soaking tank being in communication with said liquid outlet tube;
   an air dispensing frame disposed at the bottom of said soaking tank having a plurality of air outlets disposed thereon;
   an air compressor in communication with said air dispensing frame;
   an air filter disposed in front of and associated with said air compressor;
   a food outlet passage disposed at one side of said soaking tank for accommodation of the soaked food poured out of said food receiving basket via said pivotal door.

2. An improved vibrational soaking device as claimed in claim 1 wherein a high-temperature germicide unit and a soaking liquid supplement tank are located between said liquid outlet tube and said recycling tube so as to permit used liquid to be recycled, supplemented and sterilized for further use.

* * * * *